(12) United States Patent
Jeong et al.

(10) Patent No.: US 8,761,343 B2
(45) Date of Patent: Jun. 24, 2014

(54) FIELD EMISSION X-RAY TUBE AND METHOD OF OPERATING THE SAME

(75) Inventors: Jin Woo Jeong, Daejeon (KR); Yoon-Ho Song, Daejeon (KR); Juntae Kang, Daegu (KR); Jae-Woo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 376 days.

(21) Appl. No.: 13/315,954

(22) Filed: Dec. 9, 2011

(65) Prior Publication Data

US 2012/0148027 A1 Jun. 14, 2012

(30) Foreign Application Priority Data

Dec. 10, 2010 (KR) .......................... 10-2010-0125973

(51) Int. Cl.
*H01J 35/14* (2006.01)
*H01J 35/06* (2006.01)
*H01J 35/00* (2006.01)

(52) U.S. Cl.
CPC ..................................... *H01J 35/14* (2013.01)
USPC ............................ 378/138; 378/136; 378/121

(58) Field of Classification Search
CPC ............ H05G 1/22; H01J 35/04; H01J 35/14; H01J 35/06
USPC ................................. 378/119–123, 136, 138
See application file for complete search history.

(56) References Cited

U.S. PATENT DOCUMENTS

| | | | | |
|---|---|---|---|---|
| 5,729,584 | A * | 3/1998 | Moorman et al. ............. | 378/146 |
| 6,333,968 | B1 * | 12/2001 | Whitlock et al. ............. | 378/136 |
| 6,661,876 | B2 * | 12/2003 | Turner et al. ................. | 378/138 |
| 8,295,440 | B2 * | 10/2012 | Cho et al. ...................... | 378/122 |
| 2004/0208287 | A1 * | 10/2004 | Deuringer ..................... | 378/121 |
| 2005/0281379 | A1 * | 12/2005 | Qiu et al. ....................... | 378/122 |

FOREIGN PATENT DOCUMENTS

| | | |
|---|---|---|
| KR | 2003-0074605 | 9/2003 |
| WO | WO-0231857 A1 | 4/2002 |

\* cited by examiner

*Primary Examiner* — Irakli Kiknadze
(74) *Attorney, Agent, or Firm* — Rabin & Berdo, P.C.

(57) ABSTRACT

Provided is a field emission X-ray tube. The field emission X-ray tube includes a cathode electrode provided to one end of a vacuum vessel and including a field emission emitter, an anode electrode provided to the other end of the vacuum vessel in an extending direction of the vacuum vessel, and a gate electrode provided on an outer surface of the vacuum vessel adjacent to the cathode electrode.

20 Claims, 7 Drawing Sheets

FIELD EMISSION X-RAY TUBE AND METHOD OF OPERATING THE SAME

CROSS-REFERENCE TO RELATED APPLICATIONS

This U.S. non-provisional patent application claims priority under 35 U.S.C. §119 of Korean Patent Application No. 10-2010-0125973, filed on Dec. 10, 2010, the entire contents of which are hereby incorporated by reference.

BACKGROUND OF THE INVENTION

The present invention disclosed herein relates to a field emission X-ray tube and a method of operating the same, and more particularly, to a subminiaturized field emission X-ray tube and a method of operating the same.

A typical field emission X-ray tube generates electrons from a field emission emitter by a mesh-type gate electrode provided in a vacuum vessel, accelerates the generated electrons to several to several tens of kV, and makes the electrons hit a target anode electrode to thereby generate an X-ray. The generated X-ray is constituted of a characteristics X-ray determined by unique characteristics of materials used for the target anode electrode and a continuous X-ray generated due to deceleration of the accelerated electrons. Herein, one or more focusing electrodes are selectively added between an anode electrode and a gate electrode so that an electron beam is focused to one point of the anode electrode.

Since the mesh-type gate electrode, where a hole is formed for the electron beam to pass, is relatively close to a cathode electrode in comparison with the anode electrode, an insulator is inserted to the mesh-type gate electrode for maintaining electric insulation. Further, an insulator is provided between the focusing electrode and the gate electrode for electric insulation between them. These insulators include nonconductive materials such as glass and ceramic, and may be formed in various shapes according to use of an X-ray tube. As described above, the insulators are layered between the gate electrode and the focusing electrodes causing complicated structure. Therefore, subminiaturization and manufacturing process are difficult.

For operating a field emission X-ray tube, a positive gate voltage is applied to the gate electrode, and a positive acceleration voltage is applied to the anode electrode based on electric potential of the cathode electrode. Herein, a voltage for focusing the electric beam is applied to the focusing electrode, and the voltage applied to the focusing electrode may be changed according to operation conditions. According to such an operation method, the gate voltage should be applied as a pulse form for generating a pulse-type X-ray. Further, in the case of applying a high gate voltage, a driving circuit is complicated for applying a voltage ranging from several volts to hundreds of volts as the pulse form. For instance, in the case that an operating filed of the field emission emitter is about $5V/\mu m$, and a distance between the gate electrode and the cathode electrode is about 100 $\mu m$, the operating voltage applied to the gate electrode should be a pulse voltage of about 500V.

For protecting the field emission emitter from a electric field generated by a high voltage of the anode electrode, it is needed to form a diameter of the hole of the mesh-type gate electrode equal to or smaller than the distance between the gate electrode and the cathode electrode. In the case that the hole diameter of the gate electrode is larger than the distance between the gate electrode and the cathode electrode, the electric field generated by the anode electrode may influence the field emission emitter hindering 3-electrode operation of the field emission X-ray tube, or the field emission emitter may be damaged due to generation of an arc or the like.

Also, when electrons hit the target anode electrode and energy of the electrons are converted to thereby generate X-ray, most of electron energy is generated as heat due to low conversion efficiency. Therefore, cooling the anode electrode is an important factor for operating the field emission X-ray tube. In the case of the typical field emission X-ray tube, if a voltage of tens of kV is applied to the anode electrode, it is not easy to cool the anode electrode due to a limitation of insulation.

Moreover, in the case of using the mesh-type gate electrode, the field emission X-ray tube may be fabricated to have a diameter of several centimeters. However, if the field emission X-ray tube is subminiaturized to have a small diameter of several millimeters, it is not easy to fabricate the gate electrode and the focusing electrode.

SUMMARY OF THE INVENTION

The present invention provides a subminiaturized field emission X-ray tube capable of driving a high voltage pulse with a low voltage.

The present invention also provides a method for operating a subminiaturized field emission X-ray tube capable of driving a high voltage pulse with a low voltage.

Embodiments of the present invention provide field emission X-ray tubes including a cathode electrode provided to one end of a vacuum vessel and including a field emission emitter, an anode electrode provided to the other end of the vacuum vessel in an extending direction of the vacuum vessel, and a gate electrode provided on an outer surface of the vacuum vessel adjacent to the cathode electrode.

In some embodiments, an inner arc prevention layer for a gate electrode provided on an inner surface of the vacuum vessel corresponding to the gate electrode may be further included, and the inner arc prevention layer for a gate electrode may include conductive material.

In other embodiments, an outer arc prevention layer for a gate electrode provided on an outer surface of the vacuum vessel to cover the gate electrode may be further included, and the outer arc prevention layer for a gate electrode may include insulating material.

In still other embodiments, a region of the vacuum vessel where the gate electrode is provided may have a smaller diameter than another region.

In even other embodiments, the field emission emitter may have a form of carbon nanotube.

In yet other embodiments, a transistor electrically connected to the cathode electrode and configured to act as a switch may be further included.

In further embodiments, a focusing electrode on an outer surface of the vacuum vessel, wherein the focusing electrode is located farther from the cathode electrode than the gate electrode may be further included.

In still further embodiments, an inner arc prevention layer for a focusing electrode provided on an inner surface of the vacuum vessel corresponding to focusing electrode may be further included, and the inner arc prevention layer for a focusing electrode may include conductive material.

In even further embodiments, an outer arc prevention layer for a focusing electrode provided on an outer surface of the vacuum vessel to cover the focusing electrode may be further included, and the outer arc prevention layer for a focusing electrode may include insulating material.

In yet further embodiments, a diameter of the vacuum vessel may be less than one centimeter.

In other embodiments of the present invention, methods for operating a field emission X-ray tube having the above-described structure include grounding the anode electrode, respectively applying a negative accelerating voltage, and the negative accelerating voltage or a positive driving pulse signal to a source and a gate of a transistor electrically connected to the cathode electrode including the field emission emitter through a drain of the transistor, wherein the negative accelerating voltage is used as a reference voltage for the positive driving pulse signal, and applying a gate voltage to the gate electrode.

In some embodiments, the field emission X-ray tube may not be driven when the negative accelerating voltage is applied to the gate of the transistor, and a field emission from the field emission emitter may be stopped when the negative accelerating voltage is applied to the gate of the transistor thereby floating the cathode electrode.

In other embodiments, the gate electrode may induce a field emission from the field emission emitter using a voltage difference between the gate voltage and the negative accelerating voltage.

In still other embodiments, the field emission X-ray tube may further include a focusing electrode, and applying a focusing voltage to the focusing electrode may be further included.

In even other embodiments, the focusing electrode may focus an electron beam induced by field emission from the field emission emitter to the anode electrode using a voltage difference between the focusing voltage and the negative accelerating voltage.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

The terms used in the specification are not for limiting the present invention but for describing the embodiments. The terms of a singular form may include plural forms unless otherwise specified. The meaning of "include," "comprise," "including," or "comprising," specifies a property, a region, a fixed number, a step, a process, an element and/or a component but does not exclude other properties, regions, fixed numbers, steps, processes, elements and/or components. Also, reference numerals suggested according to the sequence of description are not limited to the sequence. In addition, it will also be understood that when a layer (or film) is referred to as being 'on' another layer or substrate, it can be directly on the other layer or substrate, or intervening layers may also be present.

Also, the embodiments will be described referring to ideal exemplary diagrams, i.e., cross-sectional views and/or planar views. In the drawings, dimensions are exaggerated for clarification. Therefore, forms of the exemplary diagrams may be changed according to fabricating technology and/or allowable error. Therefore, the embodiments of the present invention are not limited to the particular forms illustrated in the drawings but also include variations of forms generated according to a fabricating process. For instance, an etch region illustrated as a rectangular form may have a round form or may have a certain curvature. Therefore, the regions illustrated in the drawings are schematic, and the shapes of the regions illustrated in the drawings are not for limiting the scope of the invention but for exemplifying particular forms of elements.

Figure 1:
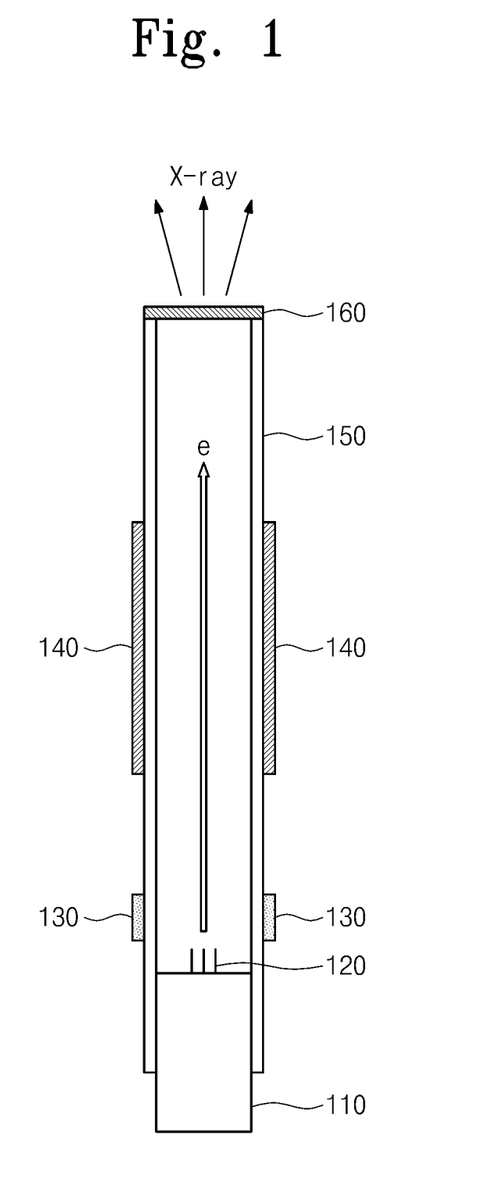
FIG. 1 is a cross-sectional view illustrating a field emission X-ray tube according to an embodiment of the present invention.
Figure 2:
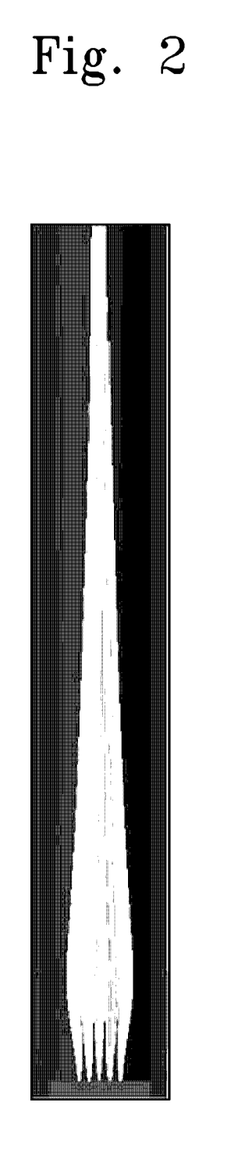
FIG. 2 is a cross-sectional view illustrating a result of simulation of electron beam induction and focusing path of the field emission X-ray tube according to the embodiment of the present invention.

FIG. 1 is a cross-sectional view illustrating a field emission X-ray tube according to an embodiment of the present invention, and FIG. 2 is a cross-sectional view illustrating a result of simulation of electron beam induction and focusing path of the field emission X-ray tube according to the embodiment of the present invention.

Referring to FIG. 1, the field emission X-ray tube includes a vacuum vessel 150, a cathode electrode 110 provided to one end of the vacuum vessel 150 and including a field emission emitter 120, an anode electrode 160 provided to the other end of the vacuum vessel 150 in an extending direction of the vacuum vessel 150, and a gate electrode 130 provided on an outer surface of the vacuum vessel 150 adjacent to the cathode electrode 110. The field emission X-ray tube may further include a focusing electrode 140 provided on an outer surface of the vacuum vessel 150 and located farther from the cathode electrode 110 than the gate electrode 130.

In the field emission X-ray tube according to the embodiment of the present invention, the gate electrode 130 and the focusing electrode 140 are formed at the outside of the vacuum vessel 150 unlike a typical field emission X-ray tube. Since emission of an electron 'e' from the field emission emitter 120 of the cathode electrode 110 and focusing an electron beam (bold arrow) are performed by an electric field, it may be possible to emit the electron 'e' and focus the electron beam (bold arrow) even though the gate electrode 130 and the focusing electrode 140 are provided on the outer surface of the vacuum vessel 150.

Structure and size of the vacuum vessel 150 of the field emission X-ray tube, and positions and sizes of the gate electrode 130 and the focusing electrode 140 may be changed according to use of the electron beam (bold arrow).

Since a mesh-type gate electrode provided in a vacuum vessel is used for a typical field emission X-ray tube, it is difficult to fabricate the vacuum vessel such that the vacuum vessel has a small diameter of several millimeters. On the contrary, since the gate electrode 130 provided at the outside of the vacuum vessel 150 is used for the field emission X-ray tube according to the embodiment of the present invention, the vacuum vessel 150 may be fabricated to have a small diameter of several millimeters less than a centimeter. As a result, the field emission X-ray tube according to the embodiment of the present invention may be subminiaturized.

Referring to FIG. 2, a result of simulation of electron beam induction and focusing path of the field emission X-ray tube according to the embodiment of the present invention using OPERA-3D Scalar simulator is shown. As illustrated, the electron beam induction and focusing path of the field emission X-ray tube are good.

According to structure and size of the vacuum vessel 150 of the field emission X-ray tube, and positions and sizes of the gate electrode 130 and the focusing electrode 140, aspects of the electron beam (bold arrow) induction and focusing path may be changed.

Figure 3:
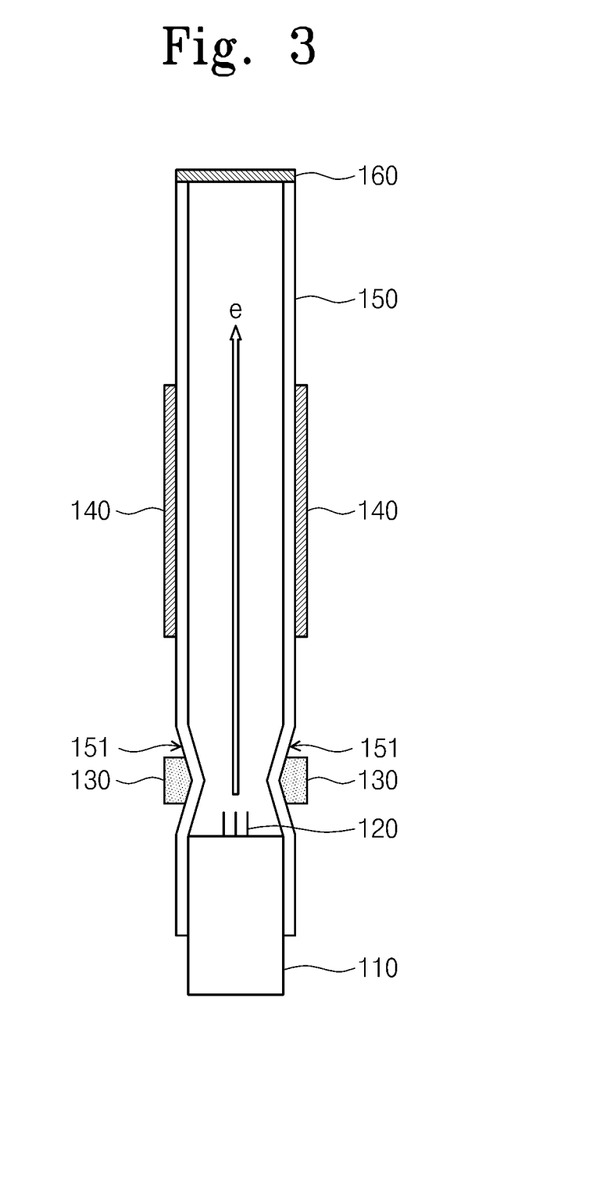
FIGS. 3 to 5 are cross-sectional views illustrating field emission X-ray tubes according to other embodiments of the present invention.
Figure 4:
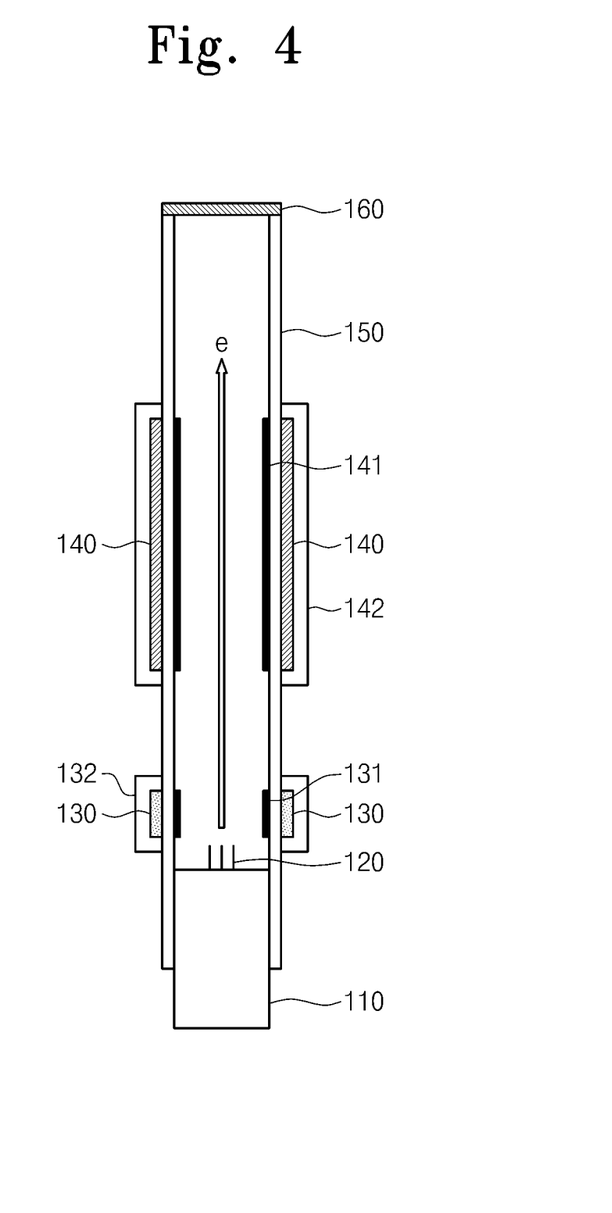
Figure 5:
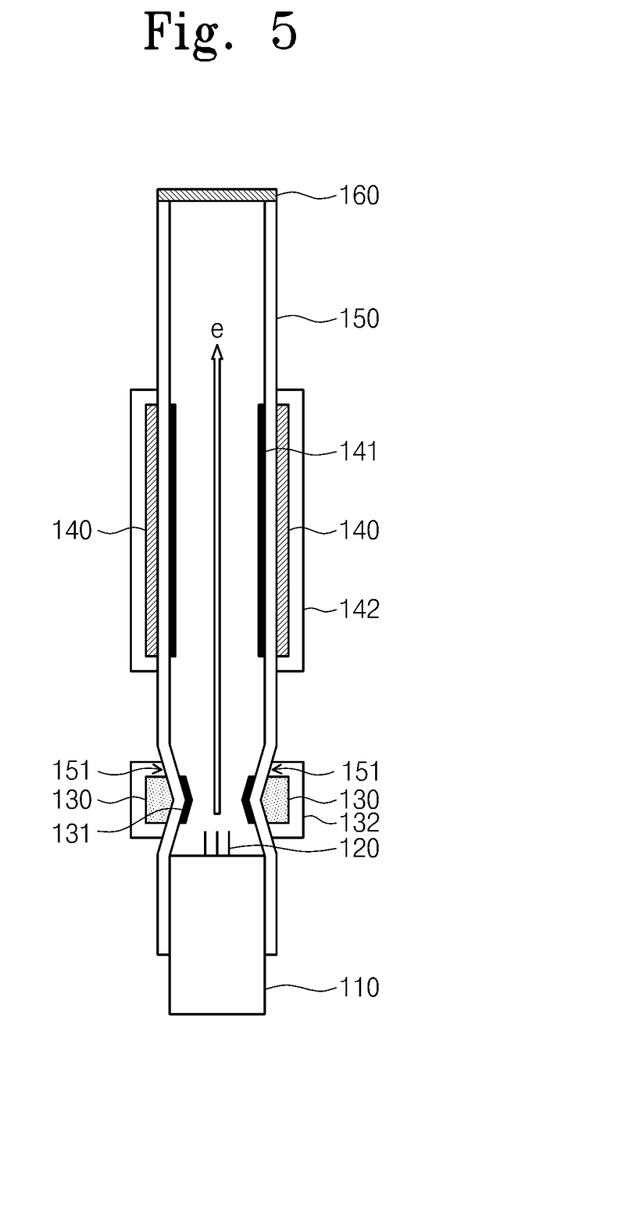

Hereinafter, field emission X-ray tubes according to other embodiments of the present invention will be described referring to FIGS. 3 to 5. FIGS. 3 to 5 are cross-sectional views illustrating field emission X-ray tubes according to other embodiments of the present invention respectively. The structural elements described through the above-mentioned embodiment of the present invention are referred to as the same reference numerals, and descriptions for them are omitted.

In comparison with the field emission X-ray tube according to the embodiment of the present invention illustrated in FIG. 1, a field emission X-ray tube according to another embodiment of the present invention illustrated in FIG. 3 has a different structure of the vacuum vessel 150.

A region of the vacuum vessel 150 where the gate electrode 130 is provided may be a dent region 151. That is, the region of the vacuum vessel 150 where the gate electrode 130 is provided may have a smaller diameter than other regions.

When electrons are emitted from the field emission emitter 120, an electron beam current is influenced by intensity of an electric field applied to the field emission emitter 120. Therefore, in the case of applying the same voltage to the gate electrode 130, a distance between the gate electrode 130 and the field emission emitter 120 may be shortened for applying a higher electric field to the field emission emitter 120.

Since the region of the vacuum vessel 150 where the gate electrode 130 is provided is the dent region 151, a distance between the gate electrode 130 and the field emission emitter 120 may be more shortened. Therefore, even though a lower voltage is applied to the gate electrode 130, the same electric field may be applied to the field emission emitter 120. As a result, the field emission X-ray tube capable of driving a high voltage pulse with a low voltage may be provided.

In comparison with the field emission X-ray tube according to the embodiment of the present invention illustrated in FIG. 1, a field emission X-ray tube according to another embodiment of the present invention illustrated in FIG. 4 further includes arc prevention layers 131, 132, 141, and 142 on an inner surface and an outer surface of the vacuum vessel 150.

The inner arc prevention layer 131 for a gate electrode may be further provided on an inner surface of the vacuum vessel 150 corresponding to the gate electrode 130. In the case that the field emission X-ray tube further includes the focusing electrode 140, the inner arc prevention layer 141 for a focusing electrode may be further provided on an inner surface of the vacuum vessel 150 corresponding to the focusing electrode 140. The inner arc prevention layer 131 for a gate electrode and the inner arc prevention layer 141 for a focusing electrode may include metal and conductive materials. The metal and conductive material may be used for the gate electrode 130 and the focusing electrode 140.

Since the vacuum vessel 150 is composed of insulating material, electric charges may be accumulated in the vacuum vessel 150 because of secondary electrons generated when the electron beam (bold arrow) collides with the vacuum vessel 150. In the case that the charges accumulated in the vacuum vessel 150 are discharged, arc damage may occur at the field emission emitter 120. For preventing the accumulated charges from being discharged, the inner arc prevention layer 131 for a gate electrode and the inner arc prevention layer 141 for a focusing electrode may be further provided on an inner surface of the vacuum vessel 150 corresponding to the gate electrode 130 and the focusing electrode 140. Areas and forms of the inner arc prevention layer 131 for a gate electrode and the inner arc prevention layer 141 for a focusing electrode may be adjusted according to use of the electron beam (bold arrow).

In addition, the outer arc prevention layer 132 for a gate electrode may be further provided on an outer surface of the vacuum vessel 150 to cover the gate electrode 130. In the case that the field emission X-ray tube further includes the focusing electrode 140, the outer arc prevention layer 142 for a focusing electrode may be further provided on an outer surface of the vacuum vessel 150 to cover the focusing electrode 140. The outer arc prevention layer 132 for a gate electrode and the outer arc prevention layer 142 for a focusing electrode may include insulating materials. The insulating materials may be resins such as polyimide and epoxy.

An arc may occur at the gate electrode 130 and the focusing electrode 140 exposed to the outside of the vacuum vessel 150 due to interference with the anode electrode 160. For preventing the arc, the outer arc prevention layer 132 for a gate electrode and the outer arc prevention layer 142 for a focusing electrode may be further provided for the gate electrode 130 and the focusing electrode 140 exposed to the outside not to contact with outside air. As a result, the field emission X-ray tube capable of securing a stable operation may be provided.

In comparison with the field emission X-ray tube according to the embodiment of the present invention illustrated in FIG. 1, a field emission X-ray tube according to another embodiment of the present invention illustrated in FIG. 5 has a different structure of the vacuum vessel 150 and further includes arc prevention layers 131, 132, 141, and 142 on an inner surface and an outer surface of the vacuum vessel 150.

A region of the vacuum vessel 150 where the gate electrode 130 is provided may be a dent region 151. That is, the region of the vacuum vessel 150 where the gate electrode 130 is provided may have a smaller diameter than other regions.

Since the region of the vacuum vessel 150 where the gate electrode 130 is provided is the dent region 151, a distance between the gate electrode 130 and the field emission emitter 120 may be more shortened. Therefore, even though a lower voltage is applied to the gate electrode 130, the same electric field may be applied to the field emission emitter 120. As a result, the field emission X-ray tube capable of driving a high voltage pulse with a low voltage may be provided.

Also, the inner arc prevention layer 131 for a gate electrode may be further provided on an inner surface of the vacuum vessel 150 corresponding to the gate electrode 130. In the case that the field emission X-ray tube further includes the focusing electrode 140, the inner arc prevention layer 141 for a focusing electrode may be further provided on an inner surface of the vacuum vessel 150 corresponding to the focusing electrode 140. In addition, the outer arc prevention layer 132 for a gate electrode may be further provided on an outer surface of the vacuum vessel 150 to cover the gate electrode 130. In the case that the field emission X-ray tube further includes the focusing electrode 140, the outer arc prevention layer 142 for a focusing electrode may be further provided on an outer surface of the vacuum vessel 150 to cover the focusing electrode 140. As a result, the field emission X-ray tube capable of securing a stable operation may be provided.

Figure 6:
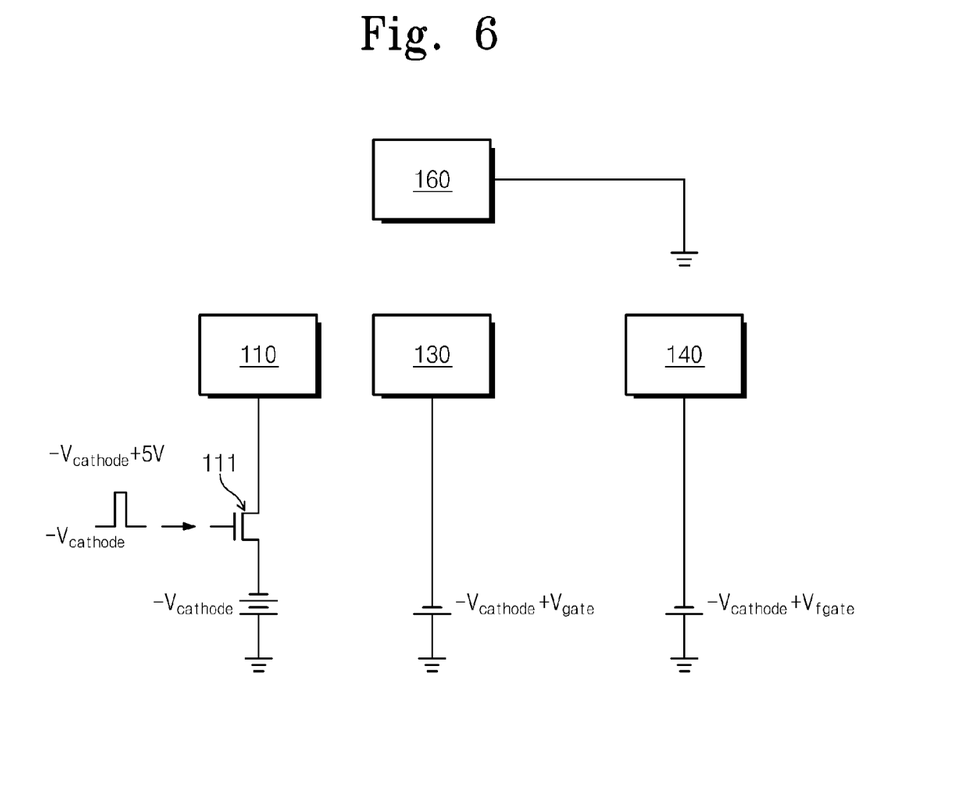
FIG. 6 is a circuit diagram for explaining a method for operating the field emission X-ray tubes according to the embodiments of the present invention.

FIG. 6 is a circuit diagram for explaining a method for operating the field emission X-ray tubes according to the embodiments of the present invention.

Referring to FIG. 6, according to the operating method of the field emission X-ray tube, voltages illustrated in FIG. 6 may be respectively applied to the cathode electrode 110, the gate electrode 130, the focusing electrode 140, and the anode electrode 160.

The anode electrode 160 may be connected to a cooling device including a heat-radiating plate or cooling water and may be grounded (0V) for easily dissipating heat generated due to the hit of an electron beam.

Herein, a transistor 111 may be connected in series to the cathode electrode 110 including the field emission emitter 120 to act as a switch. A drain of the transistor 111 may be electrically connected to the cathode electrode 110. The transistor 111 may be a Metal Oxide Semiconductor Field Effect Transistor (MOSFET). A negative accelerating voltage $-V_{cathode}$ for emitting an X-ray may be applied to a source of the transistor 111, and a positive driving pulse signal using the voltage $-V_{cathode}$ as a reference voltage may be applied to a gate of the transistor 111 for turning on/off the transistor 111. That is, the positive driving pulse signal applied to the gate of the transistor 111 may be about $-V_{cathode}+5V$. Herein, when a voltage difference between the source and the gate of the transistor 111 is about 5V, the transistor 111 acting as a switch may be turned on. When the voltage difference is about 0V, the transistor 111 acting as a switch may be turned off. That is, by alternately applying $-V_{cathode}+5V$ and $-V_{cathode}$, turning-on/off operations of the field emission X-ray tube may be repeated.

A gate voltage $-V_{cathode}+V_{gate}$ capable of inducing an electron beam may be applied to the gate electrode 130 as a direct current, and a focusing voltage $-V_{cathode}+V_{fgate}$ capable of focusing an electron beam may be applied to the focusing electrode 140 as a direct current.

When the transistor 111 is turned on, the voltage of $-V_{cathode}$ is applied to the cathode electrode 110, and a voltage difference of $V_{gate}$ is generated between the cathode electrode 110 and the gate electrode 130 so that a field emission is induced from the field emission emitter 120. On the contrary, when the transistor 111 is turned off, the cathode electrode 110 is floated, and a voltage of the cathode electrode 110 is increased by the gate voltage $-V_{cathode}+V_{gate}$ applied to the gate electrode 130. Therefore, the voltage difference between the cathode electrode 110 and the gate electrode 130 is decreased, and thus the field emission from the field emission emitter 120 is stopped. In this manner, the field emission of the field emission X-ray tube may be turned on/off.

Figure 7:
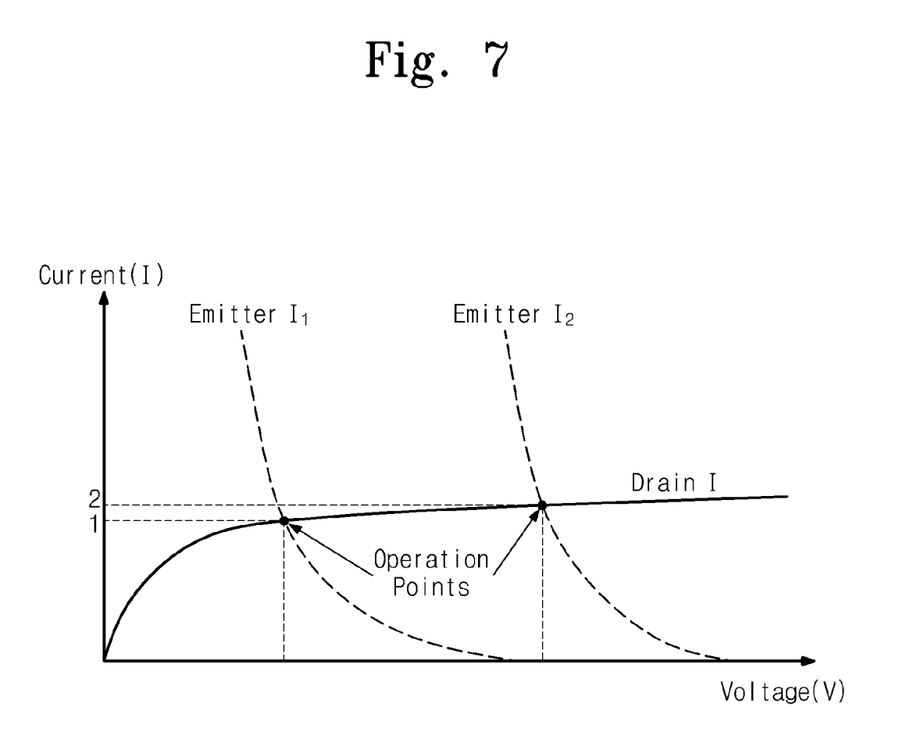
FIG. 7 is a graph for explaining current-voltage characteristics of the field emission emitters of the field emission X-ray tubes according to the embodiments of the present invention.

FIG. 7 is a graph for explaining current-voltage characteristics of the field emission emitters of the field emission X-ray tubes according to the embodiments of the present invention.

Referring to FIG. 7, when an X-ray tube is actually used, it is important to emit uniform X-ray as time passes, and this condition is easily satisfied in the case of a heat electron source. However, in the case of a field emission X-ray tube where a field emission emitter is used as an electron source, a current value becomes non-uniform as time passes due to characteristics of a field emission emitter. This limitation of a field emission emitter may be overcome using driving characteristics of a transistor.

A Carbon NanoTube (CNT) may be used for a field emission emitter of a field emission X-ray tube according to an embodiment of the present invention. A field emission emitter may be understood as a sum of electron beams emitted from a plurality of CNT emitters. Even though each CNT emitter has different current-voltage (I-V) characteristics, a current emitted from a field emission emitter and arriving at an anode electrode is determined according to saturation characteristics of a transistor regardless of characteristics of a field emission emitter in the case that a transistor is connected in series to a CNT emitter (or cathode electrode) and currents of a plurality of CNT emitters are driven within a saturation region of a transistor. That is, as illustrated in FIG. 7, currents arriving at an anode electrode from first and second CNT emitters having different characteristics are determined at positions of 1 and 2 because of saturation characteristics of a transistor, and thus the currents become substantially uniform.

If a field emission emitter is driven within a saturation region of a transistor connected in series to a cathode electrode, an electron beam current may become a very constant value as time passes according to the above-described principles even though characteristics of a field emission emitter are changed. As a result, a field emission X-ray tube where an electron beam current has a constant value as time passes may be provided.

As described above, according to the embodiments of the present invention, a gate electrode is provided on an outer surface of a field emission X-ray tube, and thus a size of the field emission X-ray tube can be subminiaturized. Accordingly, a subminiaturized field emission X-ray tube fabricated through a simple process can be provided.

Further, according to the embodiments of the present invention, since a distance between a gate electrode and a field emission emitter is short in a field emission X-ray tube, an electric field can be induced from the field emission emitter with a lower voltage. Therefore, a field emission X-ray tube capable of driving a high voltage pulse with a low voltage can be provided.

Furthermore, according to the embodiments of the present invention, a field emission X-ray tube is provided with a transistor connected in series to a field emission emitter so that a current emitted from the field emission emitter and arriving at an anode electrode can be determined regardless of characteristics of the field emission emitter. Therefore, a field emission X-ray tube where an electron beam current has a constant value as time passes can be provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A field emission X-ray tube, comprising:
  a cathode electrode provided to one end of a vacuum vessel and comprising a field emission emitter;
  an anode electrode provided to the other end of the vacuum vessel in an extending direction of the vacuum vessel; and a gate electrode provided on an outer surface of the vacuum vessel adjacent to the cathode electrode.

2. The field emission X-ray tube of claim 1, further comprising an inner arc prevention layer for a gate electrode provided on an inner surface of the vacuum vessel corresponding to the gate electrode.

3. The field emission X-ray tube of claim 2, wherein the inner arc prevention layer for a gate electrode comprises conductive material.

4. The field emission X-ray tube of claim 1, further comprising an outer arc prevention layer for a gate electrode provided on an outer surface of the vacuum vessel to cover the gate electrode.

5. The field emission X-ray tube of claim 4, wherein the outer arc prevention layer for a gate electrode comprises insulating material.

6. The field emission X-ray tube of claim 1, wherein a region of the vacuum vessel where the gate electrode is provided has a smaller diameter than another region.

7. The field emission X-ray tube of claim 1, wherein the field emission emitter has a form of carbon nanotube.

8. The field emission X-ray tube of claim 1, further comprising a transistor electrically connected to the cathode electrode and configured to act as a switch.

9. The field emission X-ray tube of claim 1, further comprising a focusing electrode on an outer surface of the vacuum vessel, wherein the focusing electrode is located farther from the cathode electrode than the gate electrode.

10. The field emission X-ray tube of claim 9, further comprising an inner arc prevention layer for a focusing electrode provided on an inner surface of the vacuum vessel corresponding to focusing electrode.

11. The field emission X-ray tube of claim 10, wherein the inner arc prevention layer for a focusing electrode comprises conductive material.

12. The field emission X-ray tube of claim 9, further comprising an outer arc prevention layer for a focusing electrode provided on an outer surface of the vacuum vessel to cover the focusing electrode.

13. The field emission X-ray tube of claim 12, wherein the outer arc prevention layer for a focusing electrode comprises insulating material.

14. The field emission X-ray tube of claim 1, wherein a diameter of the vacuum vessel is less than one centimeter.

15. A method for operating a field emission X-ray tube having a structure of claim 1, comprising:
grounding the anode electrode;
respectively applying a negative accelerating voltage, and the negative accelerating voltage or a positive driving pulse signal to a source and a gate of a transistor electrically connected to the cathode electrode comprising the field emission emitter through a drain of the transistor, wherein the negative accelerating voltage is used as a reference voltage for the positive driving pulse signal; and
applying a gate voltage to the gate electrode.

16. The method of claim 15, wherein the field emission X-ray tube is not driven when the negative accelerating voltage is applied to the gate of the transistor.

17. The method of claim 16, wherein a field emission from the field emission emitter is stopped when the negative accelerating voltage is applied to the gate of the transistor thereby floating the cathode electrode.

18. The method of claim 15, wherein the gate electrode induces a field emission from the field emission emitter using a voltage difference between the gate voltage and the negative accelerating voltage.

19. The method of claim 15, wherein the field emission X-ray tube further comprises a focusing electrode, the method further comprising applying a focusing voltage to the focusing electrode.

20. The method of claim 19, wherein the focusing electrode focuses an electron beam induced by field emission from the field emission emitter to the anode electrode using a voltage difference between the focusing voltage and the negative accelerating voltage.

* * * * *